US010961667B2

(12) United States Patent
Wiktor

(10) Patent No.: US 10,961,667 B2
(45) Date of Patent: Mar. 30, 2021

(54) PAVER AND METHOD FOR OPERATING A PAVER

(71) Applicant: Volvo Construction Equipment AB, Eskilstuna (SE)

(72) Inventor: Roland Wiktor, Hameln (DE)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 16/471,681

(22) PCT Filed: Dec. 20, 2017

(86) PCT No.: PCT/EP2017/083772
§ 371 (c)(1),
(2) Date: Jun. 20, 2019

(87) PCT Pub. No.: WO2018/115098
PCT Pub. Date: Jun. 28, 2018

(65) Prior Publication Data
US 2020/0095736 A1 Mar. 26, 2020

(30) Foreign Application Priority Data
Dec. 22, 2016 (WO) .................. PCT/SE2016/051307

(51) Int. Cl.
*E01C 19/48* (2006.01)
*B60G 11/26* (2006.01)
(Continued)

(52) U.S. Cl.
CPC ............ *E01C 19/48* (2013.01); *B60G 11/265* (2013.01); *B60G 17/056* (2013.01);
(Continued)

(58) Field of Classification Search
CPC ........... E01C 19/48; E01C 11/14; B60G 5/00; B60G 11/26; B60G 17/056; B60G 21/067;
(Continued)

(56) References Cited

U.S. PATENT DOCUMENTS 3,643,970 A * 2/1972 Gauchet ............... B60G 17/056
280/6.154
4,279,319 A * 7/1981 Joyce, Jr. ............. B60G 17/033
180/12
(Continued)

FOREIGN PATENT DOCUMENTS

CA 942112 A 2/1974
CN 105059081 A 11/2015
(Continued)

OTHER PUBLICATIONS

International Search Report and Written Opinion of the International Searching Authority, PCT/SE2016/051307, dated Sep. 18, 2017, 12 pages.
(Continued)

*Primary Examiner* — Raymond W Addie
(74) *Attorney, Agent, or Firm* — Sage Patent Group

(57) ABSTRACT

A paver includes a main vehicle body and a set of fore-wheels. The set of fore-wheels is connected to the main vehicle body via a hydraulic wheel suspension system which, in at least a paving mode of the paver, allows hydraulic level compensation for each wheel of the set of fore-wheels. The paver further includes a hydraulic motion control assembly adapted to selectively provide hydraulic spring suspension and/or hydraulic dampening to at least one wheel of the set of fore-wheels.

25 Claims, 10 Drawing Sheets

(51) Int. Cl.
  *B60G 17/056* (2006.01)
  *B60G 21/067* (2006.01)
  *B60G 5/00* (2006.01)

(52) U.S. Cl.
  CPC .............. *B60G 21/067* (2013.01); *B60G 5/00* (2013.01); *B60G 2204/4605* (2013.01); *B60G 2204/8304* (2013.01); *B60G 2300/09* (2013.01)

(58) Field of Classification Search
  CPC .... B60G 2204/4605; B60G 2204/8304; B60G 2300/09
  USPC ........................................ 404/73–75, 83–118
  See application file for complete search history.

(56) References Cited

U.S. PATENT DOCUMENTS

| | | | |
|---|---|---|---|
| 4,801,218 A | 1/1989 | Musil | |
| 4,836,564 A | 6/1989 | Heims | |
| 5,009,546 A | 4/1991 | Domenighetti et al. | |
| 5,051,025 A | 9/1991 | Taylor, Jr. | |
| 5,311,964 A | 5/1994 | Miyazaki et al. | |
| 5,733,095 A * | 3/1998 | Palmer | E02F 9/2207 414/685 |
| 6,398,227 B1 * | 6/2002 | Lech | B60G 17/0152 280/5.5 |
| 7,497,452 B2 * | 3/2009 | Schedgick | B60G 11/27 188/313 |
| 8,281,900 B2 * | 10/2012 | Boegelein | B60G 17/005 187/223 |
| 2012/0010787 A1 | 1/2012 | Buschmann et al. | |
| 2014/0133906 A1 | 5/2014 | Frelich et al. | |
| 2014/0379227 A1 | 12/2014 | Reuter et al. | |
| 2016/0222605 A1 | 8/2016 | Mings | |
| 2018/0170142 A1 * | 6/2018 | Fredriksson | B60G 21/026 |

FOREIGN PATENT DOCUMENTS

| | | |
|---|---|---|
| DE | 29704207 U1 | 4/1997 |
| DE | 29920556 U1 | 2/2000 |
| EP | 0940274 A2 | 9/1999 |
| EP | 1247904 A2 | 10/2002 |
| JP | 2000080607 A | 3/2000 |
| JP | 2015059401 A | 3/2015 |

OTHER PUBLICATIONS

International Search Report and Written Opinion of the International Searching Authority, PCT/EP2017/083772, dated Mar. 12, 2018, 18 pages.

Chinese First Office Action dated Nov. 20, 2020 for Chinese Patent Application No. 201780074625.4, 16 pages.

* cited by examiner

PAVER AND METHOD FOR OPERATING A PAVER

CROSS REFERENCE TO RELATED APPLICATIONS

This application is a 35 U.S.C. § 371 national stage application of PCT International Application No. PCT/EP/2017/083772 filed on Dec. 20, 2017, which in turn claims priority to PCT International Application No. PCT/SE2016/051307 filed on Dec. 22, 2016, the disclosures and content of which are incorporated by reference herein in their entirety.

TECHNICAL FIELD

The present invention relates to a paver according to the preamble of claim 1. Moreover, the present relates to a method for operating a paver as well as to an electronic control unit for a paver.

BACKGROUND OF THE INVENTION

In road construction, it is common to use pavers to build at least portions of the road, in particular a basic layer and a topcoat of the road. A paver generally comprises a self-propelled tractor with a front hopper adapted to receive and store material, such as asphalt. At the bottom of the hopper, a scraper type of conveyor belt transports the material to the back of the machine. There, the material is spread out by one or more augers. A screed is positioned behind the one or more augers to thereby flatten and level the material and compact the layer using vibration and tamper drives. When a paver travels for the purpose of carrying out a road finishing operation, the paving screed is in a levelling position at which it rests on the road surface layer and carries out movements relative to a chassis of the paver.

EP 1 247 904 A2 discloses a paver with a pair of rear wheels and a set of fore-wheels. The paver illustrated in EP 1 247 904 A2 further comprises a screed located rearwards of the pair of rear wheels, as seen in an intended direction of travel of the EP 1 247 904 A2 paver. During a paving operation, the screed is generally in contact with the ground resulting in that a normal force is imparted on the screed, as a consequence of which the pair of rear wheels, as well as the set of fore-wheels, are loaded in an appropriate manner.

However, in a transport operation, the screed may be raised such that it loses ground contact and this may in turn result in that the weight of the screed will be imparted on the paver rather than on the ground. Since the screed is located rearwards of the pair of rear wheels, the pair of rear wheels will in such a situation be imparted a relatively large load whereas the set of fore-wheels will generally be imparted a relatively low load. Such a load distribution between the pair of rear wheels and the set of fore-wheels may result in an undesired dynamic behaviour of the paver. For instance, during a transport operation, the paver may oscillate e.g. vertically or around a transversely extending axis.

As such, it would be desirable to improve the motion characteristics of the above-mentioned paver.

SUMMARY OF THE INVENTION

An object of the invention is to provide paver that has appropriate motion characteristics during at least a transport mode of the paver.

The object is achieved by a paver according to claim 1.

As such, the present invention relates to a paver comprising a main vehicle body. The paver comprises a set of fore-wheels. The set of fore-wheels is connected to the main vehicle body via a hydraulic wheel suspension system which, in at least a paving mode of the paver, allows hydraulic level compensation for each wheel of the set of fore-wheels.

As used herein, the expression "hydraulic level compensation" is intended to encompass each wheel of the set of fore-wheels being directly or indirectly hydraulically connected so that the wheel loads are compensated for and substantially identical. A hydraulic level compensation may also be used for setting a desired distance between the set of fore-wheels and the main vehicle body.

According to the present invention, the paver further comprises a hydraulic motion control assembly adapted to selectively provide hydraulic spring suspension and/or hydraulic dampening to at least one wheel, preferably at least two wheels, of the set of fore-wheels.

The above-mentioned hydraulic motion control assembly, which may be adapted to selectively provide hydraulic spring suspension and/or hydraulic dampening, implies that the paver motions may be suspended and/or dampened in an appropriate manner. Moreover, owing to the fact that the above-mentioned hydraulic spring suspension and/or hydraulic dampening can be selectively provided, the paver according to the present invention may be appropriately suspended and/or dampened when required, for instance during a transport operation.

To this end, it should be noted that, during a paving operation, it may be desired to provide substantially no hydraulic spring suspension or hydraulic dampening to the set of fore-wheels, since such suspension or dampening may impair the result of the paving operation. Again, the above-mentioned ability to selectively provide hydraulic spring suspension and/or hydraulic dampening implies that the hydraulic spring suspension and/or hydraulic dampening need not be applied during for instance a paving operation.

Consequently, the paver according to the present invention implies that appropriate motion characteristics can be obtained for a paving operation as well as another type of operation, such as a transport operation, of the paver.

Optionally, the set of fore-wheels comprises a pair of front fore-wheels and a pair of back fore-wheels, as seen in an intended forward direction of travel of the paver. The hydraulic motion control assembly is adapted to selectively provide hydraulic spring suspension and/or hydraulic dampening to at least each wheel of the pair of back fore-wheels.

The hydraulic spring suspension and/or hydraulic dampening of at least each wheel of the pair of back fore-wheels implies appropriate motion characteristics of the paver, for instance during a transport operation.

Optionally, the hydraulic motion control assembly comprises a hydraulic accumulator. A hydraulic accumulator may be an appropriate means for providing at least hydraulic spring suspension.

Optionally, the hydraulic motion control assembly comprises a throttling arrangement, preferably a throttling valve, in fluid communication with the hydraulic accumulator. A throttling arrangement may be an appropriate means for providing at least hydraulic dampening.

Optionally, the hydraulic wheel suspension system comprises a plurality of cylinders with a cylinder associated with each wheel of the set of fore-wheels, each cylinder having a piston side and a piston rod side. Such a hydraulic wheel suspension system implies appropriate motion characteristics during for instance a paving operation since it implies a possibility to implement hydraulic level compensation in a straightforward manner. Moreover, owing to the fact that the hydraulic wheel suspension system comprises a plurality of cylinders implies that the hydraulic motion control assembly may be associated with at least one wheel of the set of fore-wheels without the need for necessarily excessive modification of the hydraulic wheel suspension system.

Optionally, the hydraulic motion control assembly comprises a first hydraulic accumulator selectively, preferably via a first selector valve, in fluid communication with the piston side of the cylinder associated with a first wheel of the pair of back fore-wheels and a second hydraulic accumulator selectively, preferably via a second selector valve, in fluid communication with the piston side of the cylinder associated with a second wheel of the pair of back fore-wheels.

The above implementation of the hydraulic motion control assembly implies that the pair of back fore-wheels by be suspended substantially individually which in turn implies an improved lateral stability of the paver, for instance during transport of the paver.

Optionally, the piston side of the cylinder associated with the first wheel and the piston side of the cylinder associated with the second wheel are connected to each other via a back fore-wheels division valve.

Optionally, the back fore-wheels division valve is adapted to assume at least each one of an open condition, allowing fluid communication between the piston sides, and a throttling condition, allowing throttling of fluid flowing between the piston sides.

The back fore-wheels division valve according to the above implies that a throttled fluid communication between the piston sides associated with the back fore-wheels may occur even when the pair of back fore-wheels are substantially individually suspended. Such a throttled fluid communication may compensate for possible pressure differences in the piston sides which may occur if each one of the back fore-wheels is connected to an individual hydraulic accumulator when the back fore-wheels are at different elevations, for instance due to the fact that the paver is located on uneven ground.

Optionally, the hydraulic motion control assembly is selectively in fluid communication with the piston side of each cylinder associated with a wheel of the pair of back fore-wheels. As such, the hydraulic motion control assembly may be used for suspending and/or dampening compressions of each cylinder associated with a wheel of the pair of back fore-wheels.

Optionally, the hydraulic motion control assembly further is selectively in fluid communication with the piston side of each cylinder associated with a wheel of the pair of front fore-wheels. The above fluid communication may further improve the motion characteristics of the paver during at least a transport operation.

Optionally, the paver further comprises an additional hydraulic motion control assembly adapted to be selectively in fluid communication with the piston rod side of each cylinder associated with a wheel of the pair of front fore-wheels, the additional hydraulic motion control assembly preferably comprising an additional accumulator and/or an additional throttling arrangement.

The additional hydraulic motion control assembly may further improve the suspension and/or dampening of the paver. For instance, during braking of the paver, each cylinder associated with a wheel of the pair of front fore-wheels is generally compressed and, in such a scenario, it may be desired to provide hydraulic suspension and/or hydraulic damping to such compression since it may improve the longitudinal stability of the paver.

Optionally, the hydraulic motion control assembly is further selectively in fluid communication with the piston rod side of each cylinder associated with a wheel of the pair of front fore-wheels. As such, the hydraulic motion control assembly may suspend and/or dampen an extension of each cylinder associated with a wheel of the pair of front fore-wheels.

Optionally, the piston side of at least each cylinder associated with a front fore-wheel is selectively in fluid communication with a hydraulic tank, preferably via a tank throttling arrangement.

Optionally, the hydraulic motion control assembly is adapted to be in fluid communication with the hydraulic wheel suspension system via a selector valve. The selector valve is a cost-efficient implementation for selectively and fluidly connecting the hydraulic motion control assembly to the hydraulic wheel suspension system Optionally, the hydraulic wheel suspension system comprises an equalising line fluidly connecting at least the piston side of the cylinders associated with each wheel of the set of fore-wheels, the hydraulic motion control assembly being adapted to be in fluid communication with the equalising line via the selector valve.

Optionally, the selector valve is adapted to assume a closed condition, preventing fluid communication between the hydraulic wheel suspension system and the hydraulic motion control assembly, the selector valve further being adapted to assume an open condition, allowing fluid communication between the hydraulic wheel suspension system and the hydraulic motion control assembly.

Optionally, the paver comprises a screed adapted to be in a lowered position in the paving mode and in a raised position in the non-paving mode, the selector valve being adapted to assume the closed condition when the screed is in the lowered position and adapted to assume the open condition when the screed is in the raised position.

Optionally, each wheel of the set of fore-wheels is a solid material wheel. Solid material wheels imply that the wheels can be relatively small, as a consequence of which the volume of the loading area, such as a hopper, of the paver can be relatively large.

Optionally, the paver further comprises a pair of rear wheels connected to the main vehicle body, preferably the pair of rear wheels being adapted to propel the paver.

Optionally, the pair of rear wheels comprises pneumatic tires.

A second aspect of the present disclosure relates to a method for operating a paver. The paver comprises a main vehicle body. The paver comprises a set of fore-wheels. The set of fore-wheels is connected to the main vehicle body via a hydraulic wheel suspension system. The paver is operable in at least each one of a paving mode and a non-paving mode. As has been intimated hereinabove, a non-paving mode may for instance be a transport mode.

The method according to the second aspect of the present invention comprises:
  determining if the paver is operating in the paving mode or in the non-paving mode, and
  upon determination that the paver is operating in the non-paving mode, providing hydraulic spring suspension and/or hydraulic dampening to at least one wheel, preferably at least two wheels, of the set of fore-wheels by means of a hydraulic motion control assembly.

Optionally, the set of fore-wheels comprises a pair of front fore-wheels and a pair of back fore-wheels, as seen in an intended forward direction of travel of the paver, the method comprising:

upon determination that the paver is operating in the non-paving mode, providing the hydraulic spring suspension and/or the hydraulic dampening to at least each wheel of the pair of back fore-wheels.

Optionally, the method further comprises:

upon determination that the paver is operating in the paving mode, preventing the hydraulic spring suspension and/or the hydraulic dampening by means of the hydraulic motion control assembly.

Optionally, the method further comprises:

upon determination that the paver is operating in the paving mode, controlling the hydraulic wheel suspension system so as to allow hydraulic level compensation for each wheel of the set of fore-wheels.

Optionally, the hydraulic motion control assembly is adapted to be in fluid communication with the hydraulic wheel suspension system via a selector valve. The step of providing the hydraulic spring suspension and/or the hydraulic dampening comprises arranging the selector valve in an open condition, allowing fluid communication between the hydraulic wheel suspension system and the hydraulic motion control assembly.

Optionally, the paver comprises a screed adapted to be moveable relative to the main vehicle body, the method comprising detecting the position of the screed relative to the main vehicle body and:

determining that the paver is operating in the paving mode upon detection that the screed is in a lowered position and determining that the paver is operating in the non-paving mode upon detection that the screed is in a raised position.

Optionally, the paver comprises the features of any one of the above-mentioned alternatives of the first aspect of the present invention.

A third aspect of the present invention relates to an electronic control unit for a paver. The paver comprises a main vehicle body. The paver comprises a set of fore-wheels. The set of fore-wheels is connected to the main vehicle body via a hydraulic wheel suspension system which, in at least a paving mode of the paver, allows hydraulic level compensation for each wheel of the set of fore-wheels, the paver further comprising a hydraulic motion control assembly adapted to selectively provide hydraulic spring suspension and/or hydraulic dampening to at least one wheel, preferably at least two wheels, of the set of fore-wheels.

The electronic control unit is adapted to receive sensor signals to determine if the paver is operating in the paving mode or in the non-paving mode;

upon determination that the paver is operating in the non-paving mode, issue a control signal to the paver so as to provide hydraulic spring suspension and/or hydraulic dampening to at least one wheel, preferably at least two wheels, of the set of fore-wheels by means of the hydraulic motion control assembly.

Optionally, the set of fore-wheels comprises a pair of front fore-wheels and a pair of back fore-wheels, as seen in an intended forward direction of travel of the paver, wherein the electronic control unit further is adapted to:

upon determination that the paver is operating in the paving mode, issue a control signal to the paver so as to provide the hydraulic spring suspension and/or the hydraulic dampening to at least each wheel of the pair of back fore-wheels.

Optionally, the electronic control unit further is adapted to upon determination that the paver is operating in the paving mode, issue a control signal to the paver so as to prevent the hydraulic spring suspension and/or the hydraulic dampening by means of the hydraulic motion control assembly.

Optionally, the electronic control unit further is adapted to upon determination that the paver is operating in the paving mode, issue a control signal to the paver so as to allow hydraulic level compensation of the set of fore-wheels.

Optionally, the hydraulic motion control assembly is adapted to be in fluid communication with the hydraulic wheel suspension system via a selector valve. The feature of issuing a control signal to the paver so as to provide the hydraulic spring suspension and/or the hydraulic dampening comprises issuing a signal to the selector valve to assume an open condition, allowing fluid communication between the hydraulic wheel suspension system and the hydraulic motion control assembly.

Optionally, the paver comprises a screed adapted to be moveable relative to the main vehicle body, the electronic control unit being adapted to receive a signal indicative of the position of the screed relative to the main vehicle body, and determining that the paver is operating in the paving mode upon detection that the screed is in a lowered position, and determining that the paver is operating in the non-paving mode upon detection that the screed is in a raised position.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
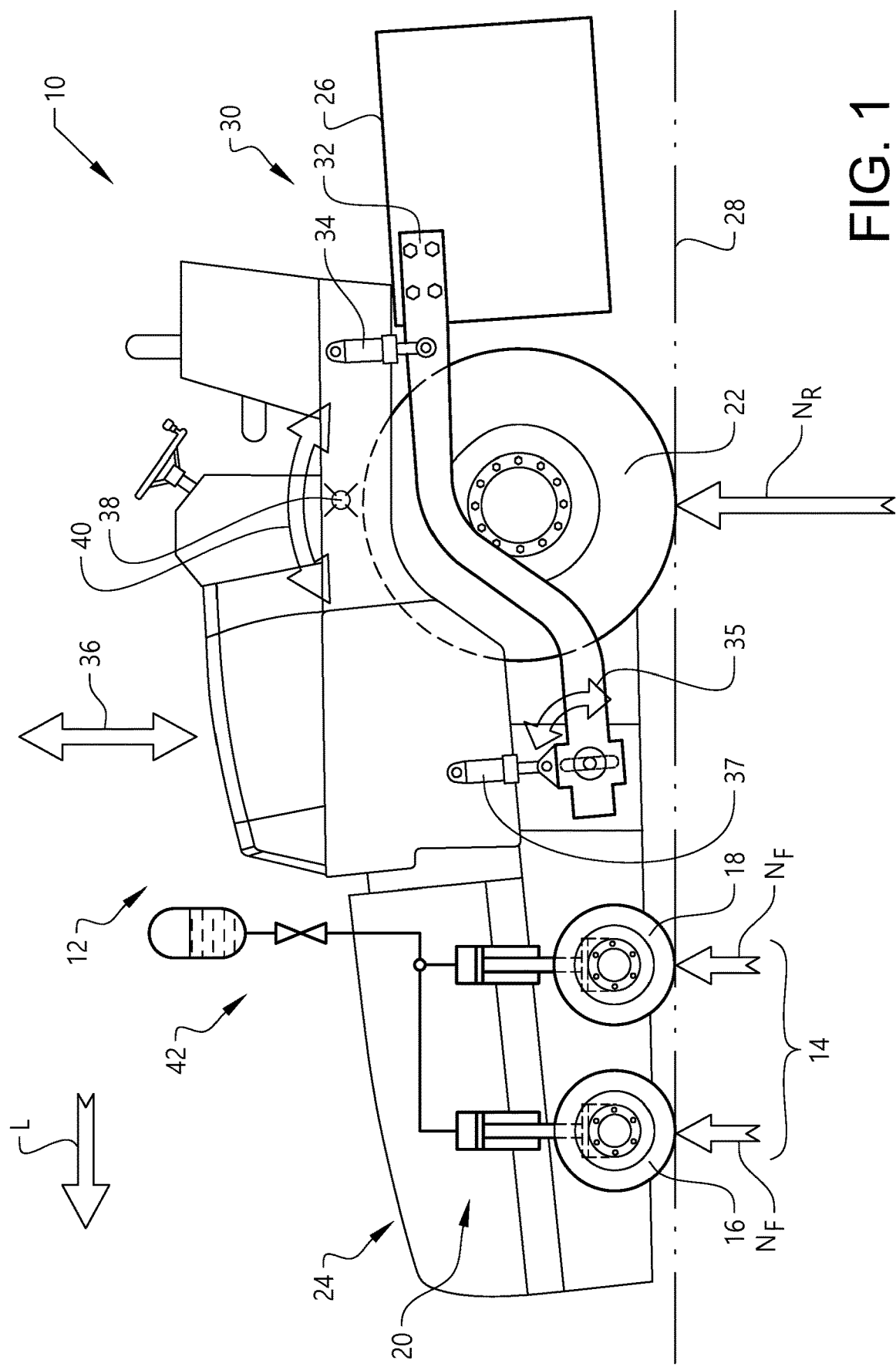
FIGS. 1 to 3 illustrate an embodiment of a paver in accordance with the present invention.

FIG. 1 illustrates a paver 10 which comprises a main vehicle body 12. Moreover, the paver comprises a set of fore-wheels 14. In the embodiment illustrated in FIG. 1, the set of fore-wheels 14 comprises a pair of front fore-wheels 16 and a pair of back fore-wheels 18, as 10 seen in an intended forward direction of travel of the paver 10. Such an intended direction of travel is indicated by the arrow L in FIG. 1. However, it is also envisioned that other embodiments of the paver 10 may comprise other configurations of the set of fore-wheels 14.

Purely by way of example, it is envisioned that embodiments of the paver 10 may comprise a set of fore-wheels 14 which comprises more than two pairs of fore-wheels (not shown). It is also envisioned that other embodiments of the paver 10 may comprise an uneven number of wheels. As non-limiting examples, embodiments of the paver 10 may comprise a single front fore-wheel and a pair of back fore-wheels (not shown) or a pair of front fore-wheels and a single back fore-wheel (not shown).

As a non-limiting example, each wheel of the set of fore-wheels 14 may be a solid material wheel.

Irrespective of its configuration, the set of fore-wheels 14 is connected to the main vehicle body 12 via a hydraulic wheel suspension system 20 which, in at least a paving mode of the paver 10, allows hydraulic level compensation for each wheel of the set of fore-wheels 14.

Moreover, as may be gleaned from FIG. 1, the paver 10 may comprise a pair of rear wheels 22 connected to the main vehicle body 12. Purely by way of example, and as is indicated in FIG. 1, the pair of rear wheels 22 may be adapted to propel the paver 10. As a non-limiting example, the pair of rear wheels 22 may comprise pneumatic tires.

FIG. 1 further illustrates that the paver 10 comprises a hopper 24 for holding and discharging paving material, such as asphalt, and a screed 26 adapted to spread out and flatten the paving material discharged from the hopper 24. The screed 26 is adapted to assume a ground contact position, in which the screed 26 contacts the ground surface 28, as well as a ground release position, in which the screed 26 does not contact the ground surface 28. Generally, the screed 26 assumes the ground contact position during a paving mode of the paver 10 such that the screed 26 can spread out and flatten the paving material discharged from the hopper 24 in an appropriate manner.

In order to be able to move the screed 26 between the ground contact position and the ground release position, the screed 26 is movably connected to the main vehicle body 12. For instance, and as is exemplified in FIG. 1, the screed 26 may be connected to the main vehicle body 12 via a link arm arrangement 30 comprising a link arm 32. The link arm 32 is pivotally connected to the main vehicle body 12 and is also connected to the screed 26, for instance also pivotally connected to the screed 26. Moreover, the link arm arrangement 30 comprises an actuator 34, exemplified as a hydraulic cylinder in FIG. 1, for effecting the raising and lowering of the link arm 32, and consequently the screed 26, relative to the main vehicle body 12. Moreover, as is indicated in FIG. 1, the link arm arrangement 30 may comprise a second actuator 37, located forward of the first actuator 34 in an intended direction of travel of the paver 10. The second actuator 37 may be used for adjusting the position of the link arm 32, and thus the distance between the screed 26 and the ground surface 28, during for instance a paving operation.

Furthermore, the paver 10 may comprise a screed sensor 35 for detecting whether or not the screed 26 is in contact with the ground surface 28. Instead of a link arm arrangement 30 such as the one presented hereinabove, it is envisioned that embodiments of the paver 10 may comprise another type of arrangement for moving the screed 26 relative to the main vehicle body 12. Purely by way of example, embodiments of the paver 10 may comprise an arrangement (not shown) for moving the screed 26 rectilinearly, for instance substantially horizontally, relative to the main vehicle body 12.

As a non-limiting example, the screed sensor 35 may be an angle sensor adapted to determine the pivot angle of the link arm 32 relative to the main vehicle body 12. As another non-limiting example, the screed sensor 35 may be adapted to determine the vertical position of the screed 26 relative to the main vehicle body 12 and/or relative to the ground 28. As a further non-limiting example, the screed sensor 35 may be adapted to determine a contact force between the screed 26 and the ground surface 28. As yet another alternative, the screed sensor 35 may be adapted to determine a current load configuration of the paver 10.

FIG. 1 illustrates the paver 10 in a condition in which the screed 26 is in a ground release position. Since the screed 26 generally has a substantial weight and since the screed 26 generally is positioned at the far rear of the paver 10, the FIG. 1 condition will result in that a relatively large part of the paver normal forces will be imparted on the pair of rear wheels 22. Such a normal force scenario is illustrated in FIG. 1 with large normal forces $N_R$ imparted on the pair of rear wheels 22 and relatively small normal forces $N_F$ imparted on the set of fore-wheels 14. In FIG. 1, the difference between the normal forces $N_R$ and $N_F$ has been exaggerated for the purpose of explanation.

When relatively large forces are imparted on the pair of rear wheels 22, this may result in the paver 10 moving in an undesired manner. For instance, the paver 10 may oscillate vertically, see arrow 36, and/or around a transversely extending axis 38, see arrow 40. For instance, such oscillations may be significant if the pair of rear wheels 22 comprises pneumatic tires since such pneumatic tires act as a spring, as a result of which the paver 10 may have a dynamic behaviour with natural frequencies that may be excited by the loads imparted on the paver 10.

In order to address an undesired motion behaviour, the FIG. 1 paver 10 further comprises a hydraulic motion control assembly 42 adapted to selectively provide hydraulic spring suspension and/or hydraulic dampening to at least one wheel, preferably at least two wheels, of the set of fore-wheels 14.

Figure 2:
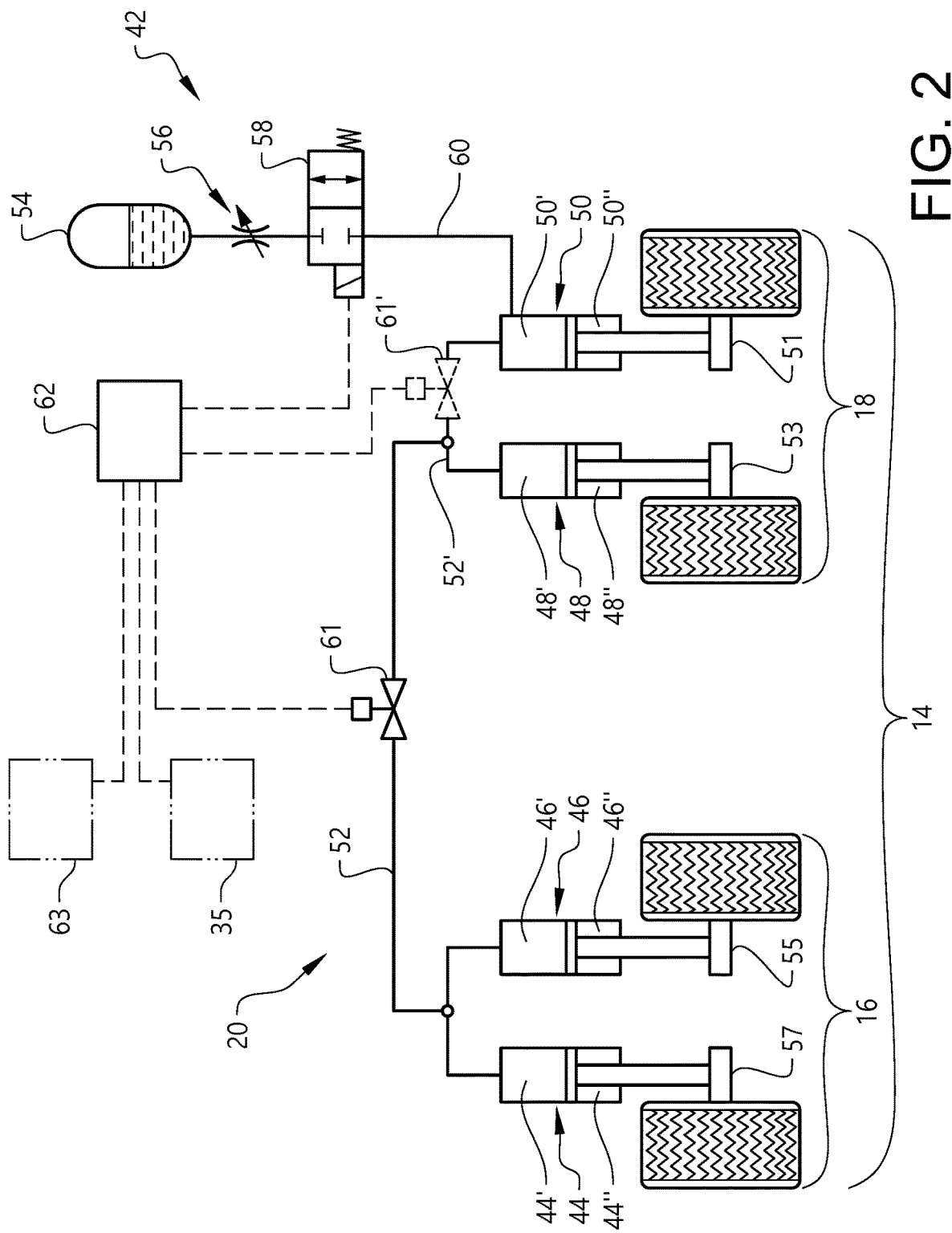

FIG. 2 schematically illustrates the hydraulic wheel suspension system 20 and the hydraulic motion control assembly 42 of the FIG. 1 paver 10. As may be gleaned from FIG. 2, the hydraulic wheel suspension system 20 illustrated therein comprises a plurality of cylinders 44, 46, 48, 50 with a cylinder associated with each wheel 14 of the set of fore-wheels, each cylinder having a piston side 44', 46', 48', 50' and a piston rod side 44", 46", 48", 50".

In the FIG. 2 embodiment, each wheel of the set of fore-wheels 14 is individually connected to the main vehicle body 12. Purely by way of example, and as is illustrated in FIG. 2, each wheel of the set of fore-wheels 14 may be connected to an individual cylinder 44, 46, 48, 50 via an individual wheel axle 51, 53, 55, 57.

Moreover, as is indicated in FIG. 2, the wheel suspension system 20 comprises an equalising line 52 fluidly connecting at least the piston side 44', 46', 48', 50' of the cylinders associated with each wheel of the set of fore-wheels. As such, during for instance a paving mode of the FIG. 1 paver 10, hydraulic fluid may flow between the piston sides 44', 46', 48', 50' thereby allowing hydraulic level compensation for each wheel of the set of fore-wheels 14.

As may be gleaned from FIG. 2, the hydraulic motion control assembly 42 may comprise a hydraulic accumulator 54. Generally, a hydraulic accumulator may be a pressure storage reservoir in which hydraulic fluid is held under pressure applied by an external source. Purely by way of example, the external source can be a spring, a raised weight or a compressed gas. As such, a hydraulic accumulator 54 generally provides hydraulic suspension to a hydraulic system.

FIG. 2 further illustrates that the hydraulic motion control assembly 42 may comprise a throttling arrangement 56. A throttling arrangement 56 generally provides hydraulic damping. Purely by way of example, the throttling arrangement 56 may be a fixed throttling. As another non-limiting example, and as is illustrated in the FIG. 2 embodiment, the throttling arrangement 56 may comprise a throttling valve which thus may comprise a variable orifice (not shown). By virtue of a throttling valve, it may be possible to adjust the throttling degree, and thus the hydraulic damping, to a hydraulic system.

As has been intimated hereinabove, the hydraulic motion control assembly 42 is adapted to selectively provide hydraulic spring suspension and/or hydraulic dampening to at least one wheel of the set of fore-wheels 42. To this end, the paver 10 preferably comprises a selector valve 58 for providing selective communication between the hydraulic motion control assembly 42 and the relevant cylinder(s). In the FIG. 2 embodiment, the paver 10 further comprises a conduit 60 connecting the selector valve 58 and the piston side 50' of the cylinder 50 associated with one of the pair of back fore-wheels 18.

As such, when the FIG. 2 selector valve 58 assumes a closed condition (such a condition is indicated in FIG. 2), fluid communication between the piston side 50' and the hydraulic motion control assembly 42 is prevented, and when the FIG. 2 selector valve 58 assumes an open condition, fluid communication between the piston side 50' and the hydraulic motion control assembly 42 is enabled.

Although it is envisioned that the hydraulic motion control assembly 42 may be used for only one wheel of the set of fore-wheels 14, it is also possible that the hydraulic motion control assembly 42 may be used for at least two wheels of the set of fore-wheels 14. To this end, reference is again made to FIG. 2 illustrating that the piston sides 48', 50' of the cylinders 48, 50 associated with a pair of rear wheels 18 are connected to one another via a portion 52' of the equalising line 52. As such, in FIG. 2, the hydraulic motion control assembly 42 is adapted to selectively provide hydraulic spring suspension and/or hydraulic dampening to at least each wheel of the pair of back fore-wheels 18.

As has been intimated hereinabove, the FIG. 2 wheel suspension system 20 comprises an equalising line 52 fluidly connecting at least the piston side 44', 46', 48', 50' of the cylinders associated with each wheel of the set of fore-wheels 14. As such, should it be desired to provide hydraulic spring suspension and/or hydraulic dampening to only the wheels of the pair of back fore-wheels 18, a division valve 61 may be used for preventing fluid communication between the cylinders 44, 46 associated with each wheel of the pair of front fore-wheels 16 and the cylinders 48, 50 associated with each wheel of the pair of back fore-wheels 18.

As another example, in the event that it should be desired to provide hydraulic spring suspension and/or hydraulic dampening to only one wheel of the pair of back fore-wheels 18, a division valve 61' (indicated by phantom lines in FIG. 2) may be used for preventing fluid communication between the cylinder 50 associated with one wheel of the pair of back fore-wheels 18 and the cylinders 44, 46, 48 of the other wheels in the set of fore-wheels 14. It is also contemplated that embodiments of the paver 10 may comprise a plurality of hydraulic motion control assemblies (not shown in FIG. 2) wherein each hydraulic motion control assembly is selectively connected to the cylinder of at least one wheel. As a non-limiting example, a first hydraulic motion control assembly may be selectively connected to one or more left hand side wheels of a paver 10 and a second hydraulic motion control assembly may be selectively connected to one or more right hand side wheels of a paver 10. Such a configuration may improve the transversal stability of a paver 10, for instance during a transport operation.

As has been indicated hereinabove, the paver 10 may comprise a screed 26 adapted to be in a lowered position in the paving mode and in a raised position in the non-paving mode. The selector valve 58 may be adapted to assume the closed condition when the screed 26 is in the lowered position and adapted to assume the open condition when the screed is in the raised position 26.

In order to control the selector valve 58, for instance employing a control strategy such as the one indicated hereinabove, and possibly also the division valve 61, 61', should the paver 10 comprise such a valve, the paver 10 preferably comprises an electronic control unit 62. The electronic control unit 62 may be adapted to transmit signals to the selector valve 58 indicative of whether the selector valve 58 should assume a closed condition or an open condition. The electronic control unit 62 may also be adapted to transmit similar signals to the division valve 61, 61' should such a valve be present in the paver 10.

The electronic control unit 62 may be adapted to determine if the paver 10 is operating in the paving mode or in the non-paving mode. To this end, the electronic control unit 62 may be in communication with the previously mentioned screed sensor 35. For instance, the electronic control unit 62 may be adapted to determine whether or not the screed 26 is in contact with the ground surface 28 on the basis of one or more signals received from the screed sensor 35. If the electronic control unit 62 determines that there is contact between the screed 26 and the ground surface 28, the electronic control unit 62 may determine that the paver 10 is operating in the paving mode. As another example, the electronic control unit 62 may be adapted to receive direct input from another component, such as the screed sensor 35, whether or not the paver 10 is operating in the paving mode.

Furthermore, the electronic control unit 62 may be adapted to receive input from an operator input means 63, such as a lever, button, keyboard, touch screen or the like, via which an operator can issue a signal indicative of the current mode of the paver 10, for instance whether or not the paver 10 is operating in the paving mode.

Moreover, the electronic control unit 62 may be adapted, upon determination that the paver 10 is operating in a non-paving mode, to issue a control signal to the paver 10 so as to provide hydraulic spring suspension and/or hydraulic dampening to at least one wheel, preferably at least two wheels, of the set of fore-wheels 14 by means of the hydraulic motion control assembly 42. As such, and as is indicated in FIG. 2, the electronic control unit 62 may be adapted to issue control signals to the selector valve 58 and also to the division valve 61, 61' in the event that the paver 10 comprises such a division valve.

Figure 3:
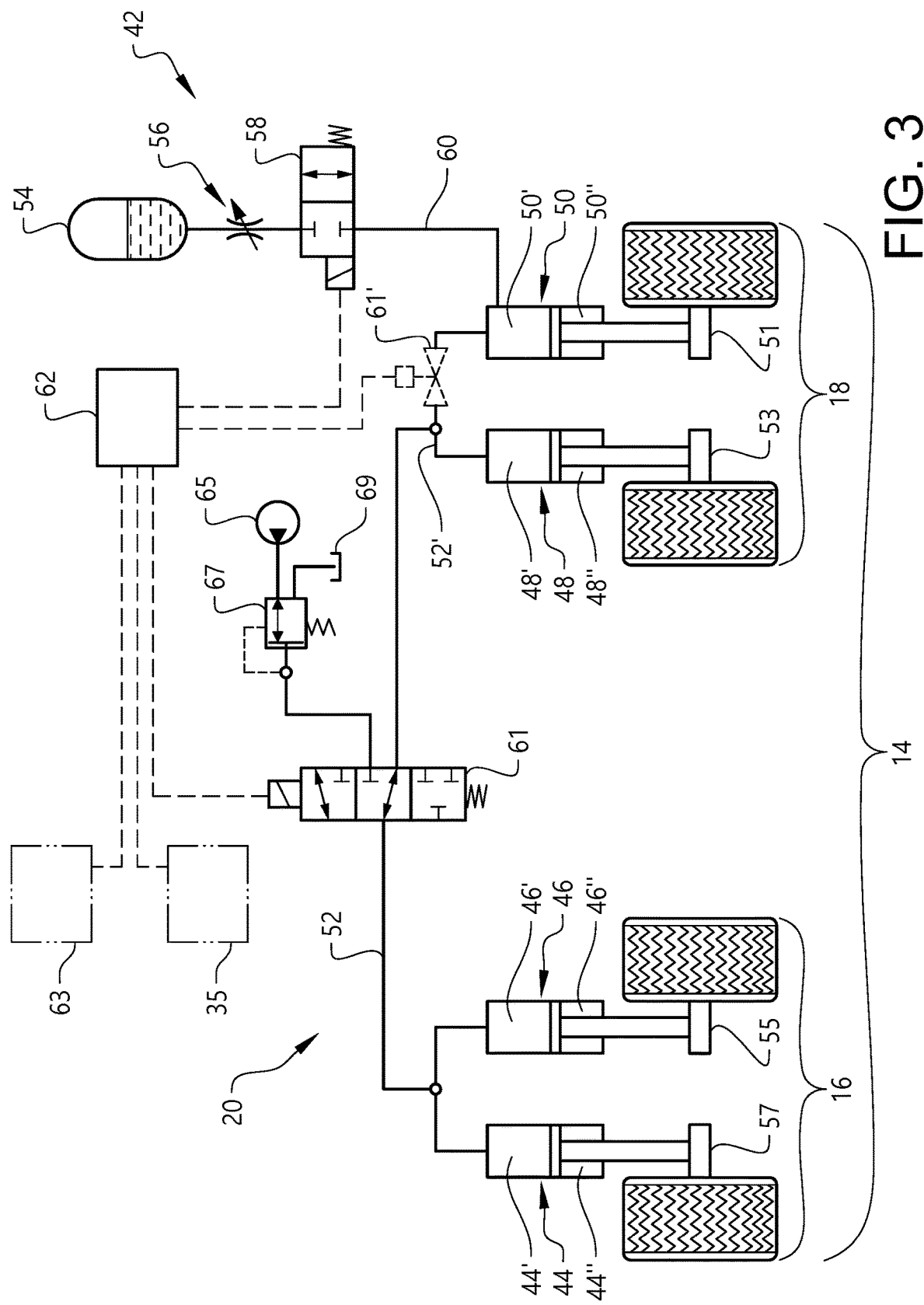

FIG. 3 illustrates an alternative to the FIG. 2 embodiment. In FIG. 3, the division valve 61 is implemented as a valve having three positions. In the centre position, as shown in FIG. 3, the piston side 44', 46', 48', 50' of the cylinders associated with each wheel of the set of fore-wheels 14 hydraulically communicate. As such, when the division valve 61 assumes the centre position in FIG. 3, hydraulic level compensation of the wheels of the set of fore-wheels 14 may be obtained.

In the lower position of the division valve 61, the pair of front fore-wheels 16 is hydraulically isolated from the pair of back fore-wheels 18. In the upper position of the division valve 61, the pair of front fore-wheels 16 can be hydraulically isolated from the pair of back fore-wheels 18. Further, in this upper position, the front pair fore-wheels can be relieved or pressurized. For this purpose, when the division valve 61 assumes its upper position in FIG. 3, the piston side 44', 46', of each cylinder 44, 46 associated with a wheel of the pair of front fore-wheels 16 can be connected to a pressure source 65, such as a pump, and a tank 69 via a pressure control valve 67.

As such, when the division valve 61 assumes its upper position, the pressure in the piston sides 44', 46' can be set by actuating the pressure control valve 67. For instance, the pressure in the piston sides 44', 46' can be reduced or increased, depending on the setting of the pressure control valve 67. In the event that the pressure in the piston sides 44', 46' is reduced by draining fluid to the tank 69 during for instance a transport operation of the paver 10, the pressure control valve 67 may be actuated such that the pressure source 65 increases the pressure in the piston sides 44', 46' before and/or during another type of operation, such as a paving operation.

Figure 4:
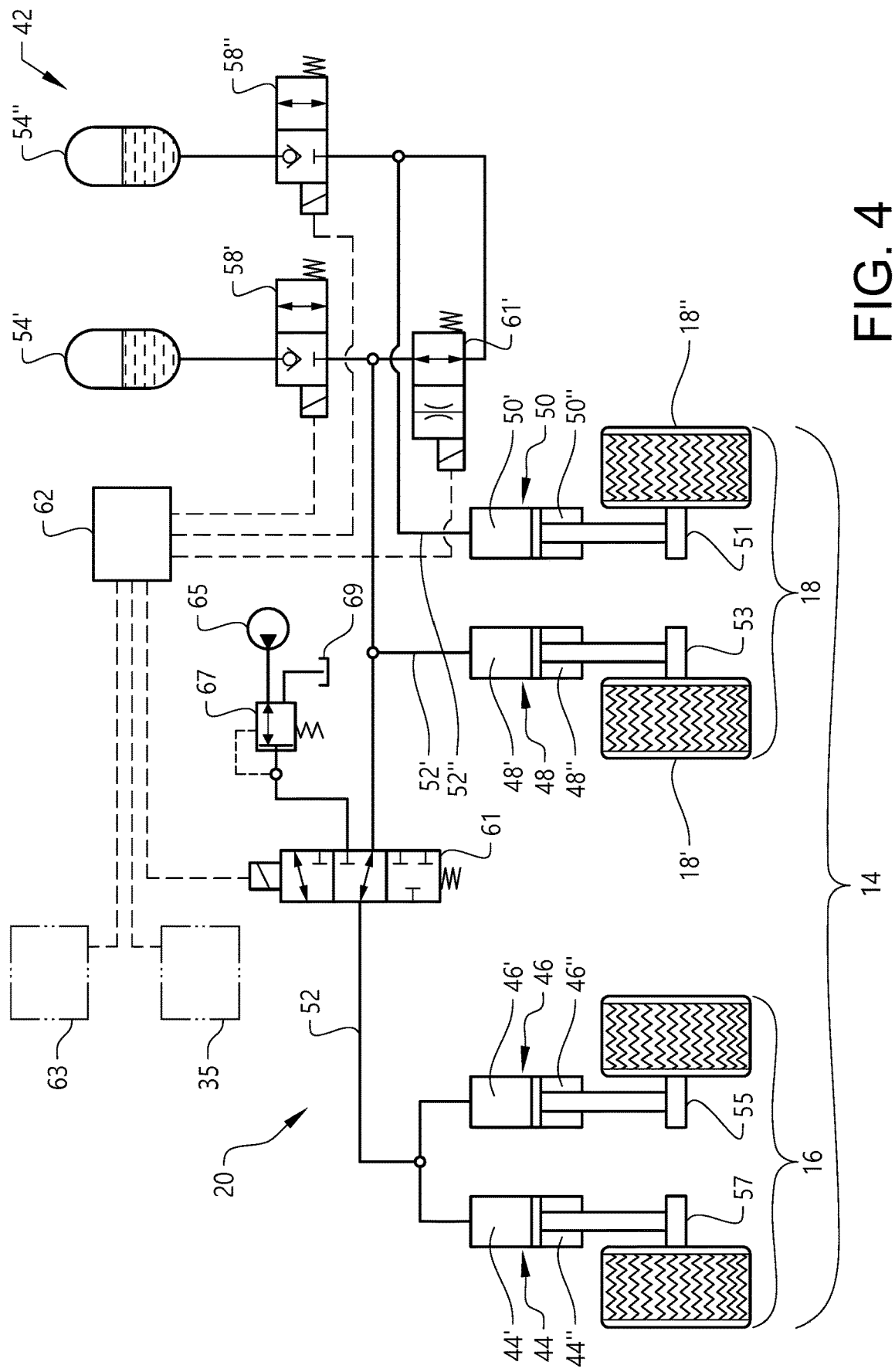
FIG. 4 illustrates an embodiment of a paver in accordance with the present invention.

FIG. 4 illustrates an alternative to the FIG. 2 and FIG. 3 embodiments. As may be realized from FIG. 4, the embodiment of the paver disclosed therein is similar to the FIG. 3 embodiment. Thus, in the below presentation of the FIG. 4 embodiment, emphasis is put on features present in FIG. 4 but not present in FIG. 3.

As may be gleaned from FIG. 4, the implementation of the hydraulic motion control assembly 42 disclosed therein comprises a first hydraulic accumulator 54' selectively in fluid communication with the piston side 48' of the cylinder 48 associated with a first wheel 18' of the pair of back fore-wheels 18. Purely by way of example, and as indicated in FIG. 4, the above selective connection may be achieved by means of a first selector valve 58'. As indicated in FIG. 4, the first selector valve 58' may preferably be adapted to assume at least each one of an open condition, allowing fluid communication between the first hydraulic accumulator 54' and the piston side 48', and a closed condition, preventing fluid communication between the first hydraulic accumulator 54' and the piston side 48'. Purely by way of example, the first wheel 18' may be the right hand side wheel of the pair of back fore-wheels 18.

Further, the FIG. 4 the implementation of the hydraulic motion control assembly 42 comprises a second hydraulic accumulator 54'' selectively in fluid communication with the piston side 50' of the cylinder 50 associated with a second wheel 18'' of the pair of back fore-wheels 18. Purely by way of example, and as indicated in FIG. 4, the above selective connection may be achieved by means of a second selector valve 58''.

As indicated in FIG. 4, the second selector valve 58'' may preferably be adapted to assume at least each one of an open condition, allowing fluid communication between the second hydraulic accumulator 54'' and the piston side 50', and a closed condition, preventing fluid communication between the second hydraulic accumulator 54'' and the piston side 50'. Purely by way of example, the second wheel 18'' may be the left hand side wheel of the pair of back fore-wheels 18.

Thus, the first and second wheels 18', 18'' of the back fore-wheels 18 may be substantially individually suspended in the FIG. 4 embodiment. Moreover, though purely by way of example, the paver 10 may be such that the piston side 48' of the cylinder 48 associated with the first wheel 18' and the piston side 50' of the cylinder 50 associated with the second wheel 18'' are connected to each other via a back fore-wheels division valve 61'. Such an implementation is indicated in FIG. 4.

Further, as indicated in FIG. 4, the back fore-wheels division valve 61' may preferably be adapted to assume at least each one of an open condition (see the right portion of the back fore-wheels division valve 61' illustrated in FIG. 4), allowing fluid communication between the piston sides 48', 50', and a throttling condition (see the left portion of the back fore-wheels division valve 61' illustrated in FIG. 4), allowing throttling of fluid flowing between the piston sides 48', 50'.

Purely by way of example, the back fore-wheels division valve 61' may comprise a first smallest orifice with a first orifice cross-sectional area through which fluid flows when the valve 61' is in the open condition and the back fore-wheels division valve 61' may also comprise a second smallest orifice with a second orifice cross-sectional area through which fluid flows when the valve 61' is in the throttling condition. As a non-limiting example, the second orifice cross-sectional area may be within the range of 5% to 0.01%, preferably within the range of 1% to 0.1% of the first orifice cross-sectional area.

As a non-limiting example, in the condition illustrated in FIG. 4, the division valve 61 is in the centre position and the back fore-wheels division valve 61' assumes the open condition, as a result of which the piston side 44', 46', 48', 50' of the cylinders associated with each wheel of the set of fore-wheels 14 hydraulically communicate. As such, hydraulic level compensation of the wheels of the set of fore-wheels 14 may be obtained.

The illustrated conditions of the valves 61, 61' may be preferred for a paver in a paving condition. In such a condition, each one of the first and second selector valves 58', 58'' may assume its closed condition.

On the other hand, in a transport condition for instance, the division valve 61 preferably prevents fluid communication between the piston sides 44', 46' and the piston sides 48', 50'. For instance, the division valve 61 may assume the top position illustrated in FIG. 4. Moreover, in a transport condition, each one of the first and second selector valves 58', 58'' may assume its open condition and the back fore-wheels division valve 61' may assume its throttling condition.

When the valves 58', 58'', 61, 61' are in the above-mentioned conditions, the wheels 18', 18'' of the pair of back fore-wheels 18 are substantially individually suspended. However, owing to the fact that the back fore-wheels division valve 61' is in its throttling condition, a limited fluid communication is allowed between the piston sides 48', 50'. Such a limited fluid communication may be beneficial if the wheels 18', 18'' for instance are located on different elevations when the suspension is activated. Purely by way of example, different elevations may occur if the paver is located on uneven ground when the suspension is activated. In such a situation, the throttling via the back fore-wheels division valve 61' implies that the wheels 18', 18'' may eventually be located on substantially the same elevation since the pressure differences in the piston sides 48', 50' may be levelled out.

Figure 5:
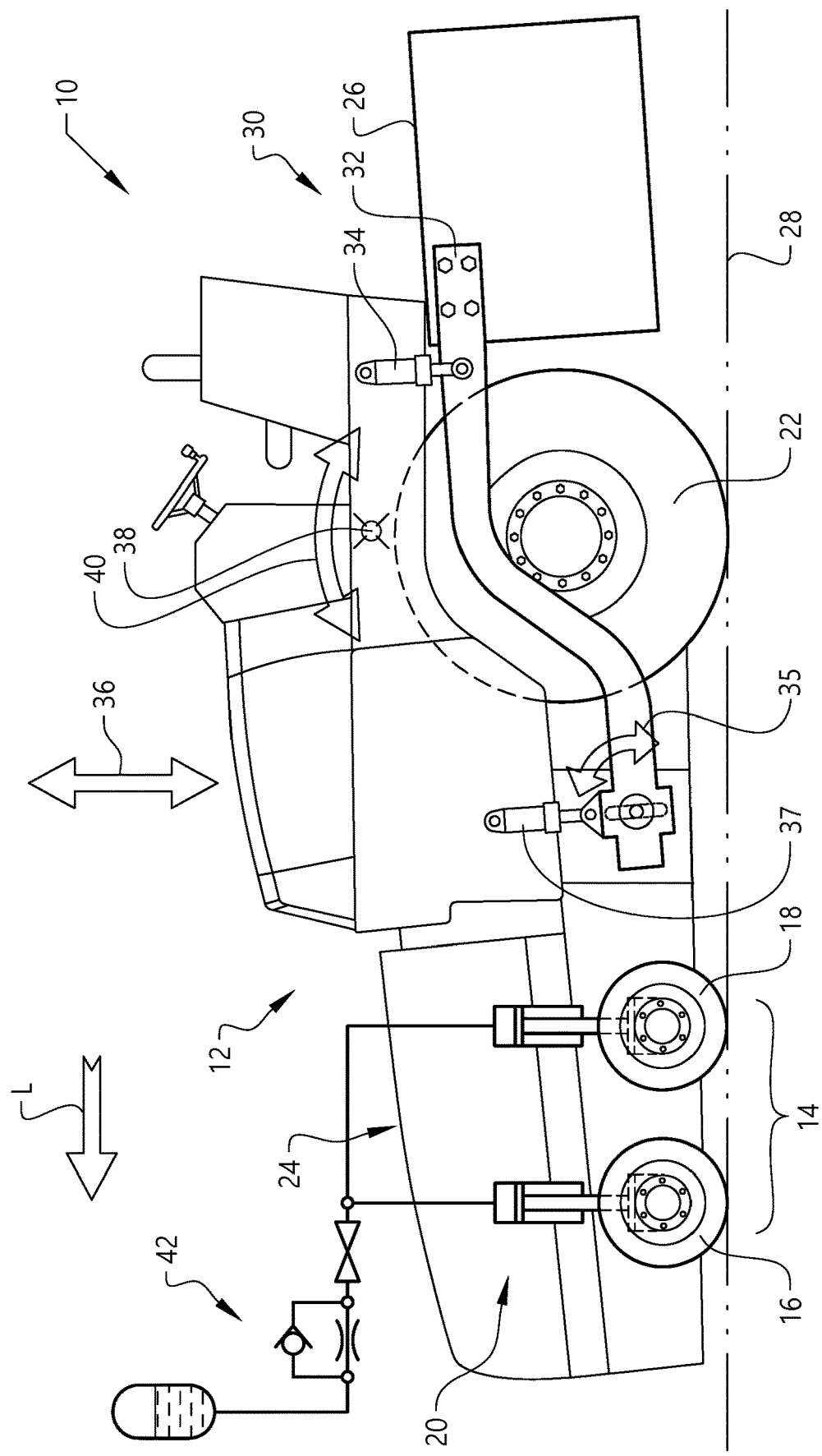
FIGS. 5 to 7 illustrate another embodiment of a paver in accordance with the present invention.
Figure 6:
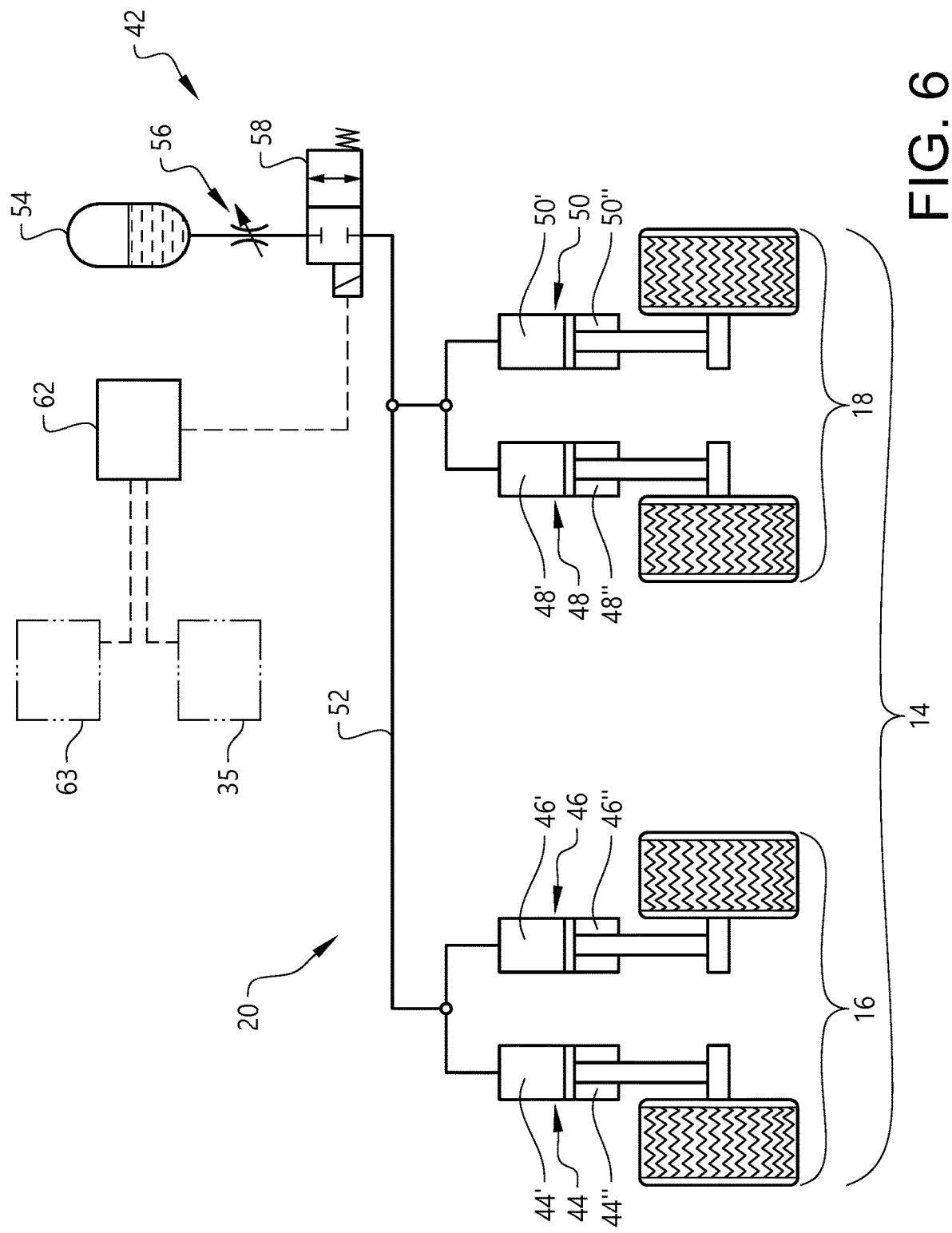

FIG. 5 and FIG. 6 illustrate another embodiment of the paver 10. The FIG. 5 and FIG. 6 embodiment comprises a plurality of features corresponding to similar features in the FIG. 1 and FIG. 2 embodiment, which features are assigned the same reference numerals but are generally not elaborated on again hereinbelow. In the FIG. 5 and FIG. 6 embodiment, the hydraulic motion control assembly 42 is further selectively in fluid communication with the piston side 44', 46', of each cylinder 44, 46 associated with a wheel of the pair of front fore-wheels 16.

As such, in the FIG. 5 and FIG. 6 embodiment, the hydraulic motion control assembly 42 is adapted to selectively provide hydraulic spring suspension and/or hydraulic dampening to all wheels of the set of fore-wheels 14. To this end, in the FIG. 5 and FIG. 6 embodiment, the hydraulic motion control assembly 42 is adapted to be in fluid communication with the above-mentioned equalising line 52 via the selector valve 58 and the FIG. 6 equalising line 52 may for instance be free from a division valve.

As a non-limiting example, and as is indicated in FIG. 6, the selector valve 58 is adapted to assume a closed condition, preventing fluid communication between the hydraulic wheel suspension system 20 and the hydraulic motion control assembly 42. Furthermore, the selector valve 58 is adapted to assume an open condition, allowing fluid communication between the hydraulic wheel suspension system 20 and the hydraulic motion control assembly 42.

As for the FIG. 2 embodiment, the FIG. 6 throttling arrangement 56 comprises a single throttling valve. However, FIG. 6 illustrates an embodiment of the paver 10 which comprises a throttling arrangement 56 which in turn comprises a first throttling valve 64 and a second throttling valve 66. Moreover, the FIG. 7 throttling arrangement 56 comprises a first non-return valve 68, allowing fluid flow in a direction from the selector valve 58 to the hydraulic accumulator 54 but preventing flow in a direction from the hydraulic accumulator 54 to the selector valve 58. Moreover, the FIG. 7 throttling arrangement 56 comprises a second non-return valve 70, allowing fluid flow in a direction from the hydraulic accumulator 54 to the selector valve 58 but preventing flow in a direction from the selector valve 58 to the hydraulic accumulator 54.

Figure 7:
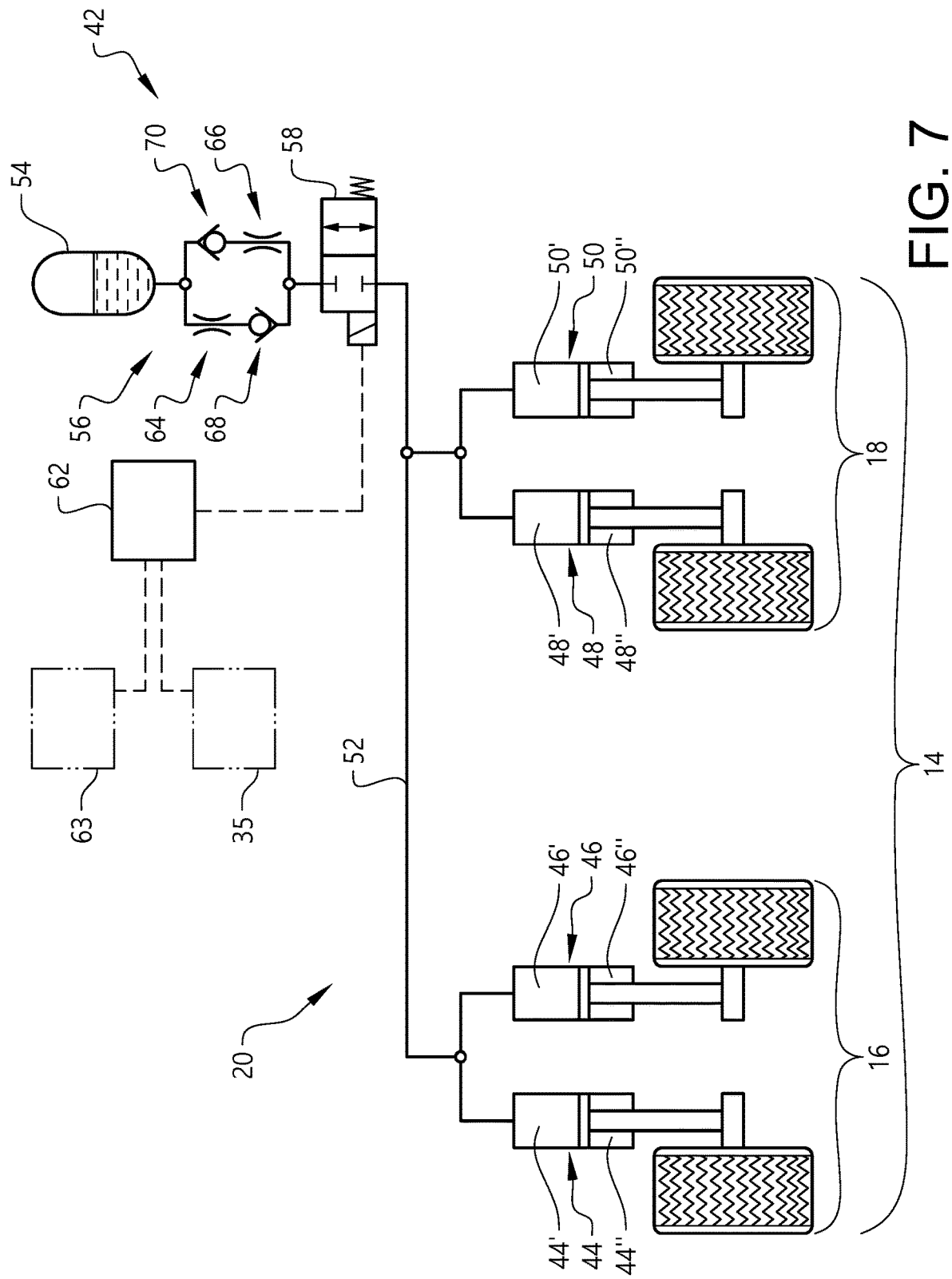

The FIG. 7 throttling arrangement embodiment implies that the throttling of fluid flowing from the selector valve 58 to the hydraulic accumulator 54 may be different from the throttling for fluid flowing from the hydraulic accumulator 54 to the selector valve 58. This in turn implies that the compression and extension of the piston sides 44', 46', 48', 50' may be associated with different throttling levels and thus different damping levels. The ability to have different damping levels for the compression and extension, respectively, of the piston sides 44', 46', 48', 50' implies that the motion characteristics of the paver 10 may be controlled in an appropriate manner.

Figure 8:
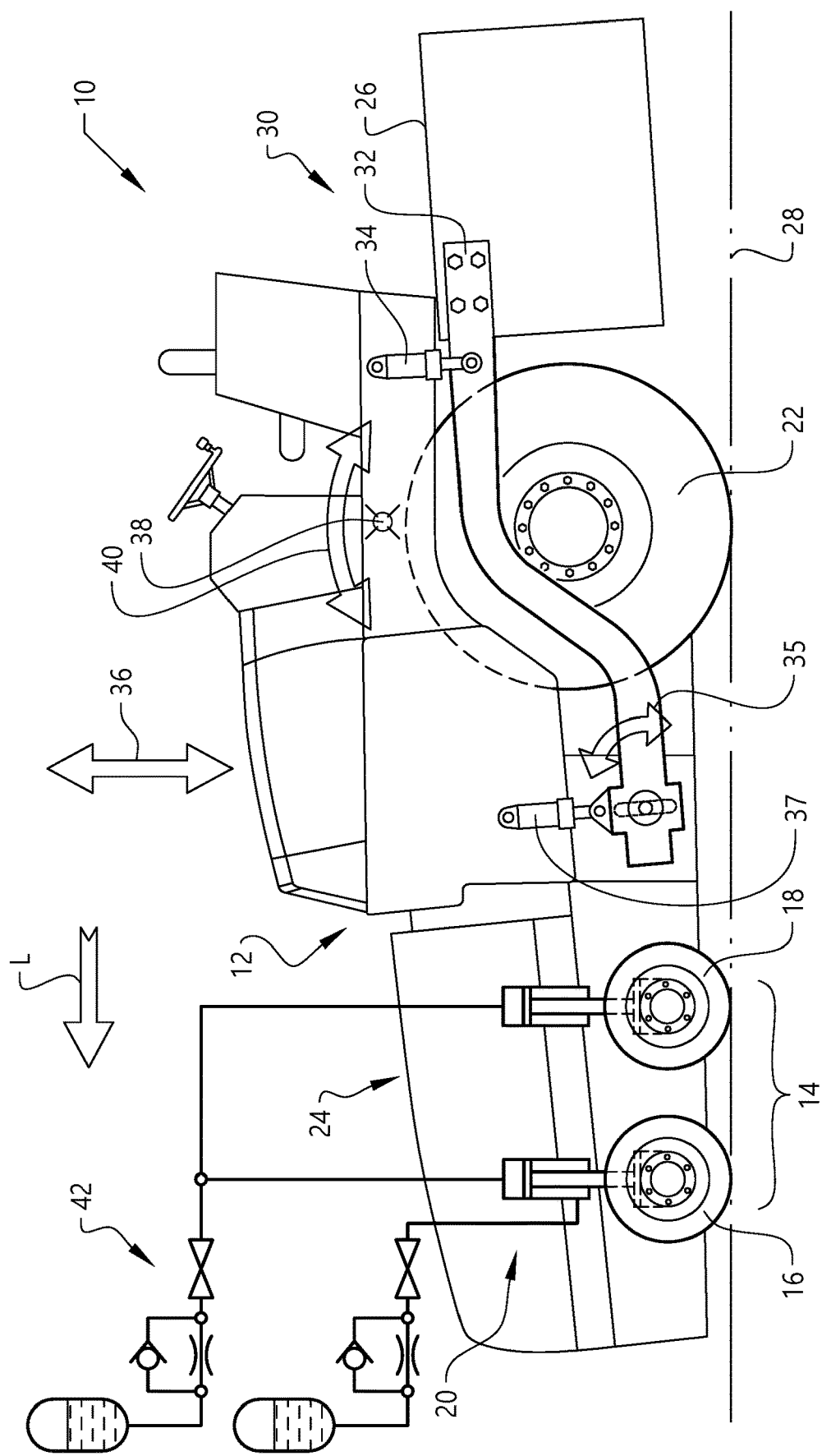
FIGS. 8 and 9 illustrate a further embodiment of a paver in accordance with the present invention.
Figure 9:
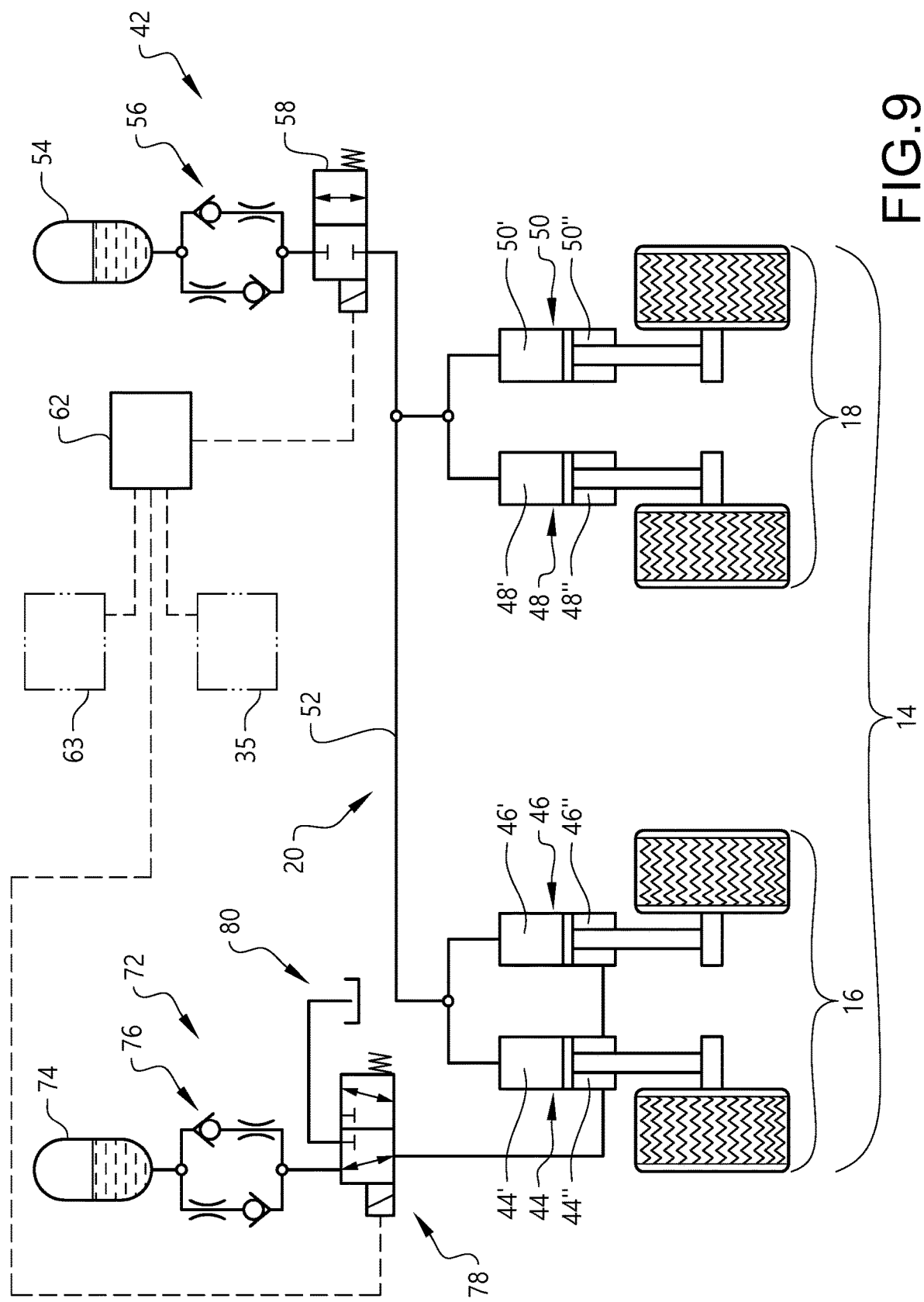

FIG. 8 and FIG. 9 illustrates another embodiment of the paver 10 which further comprises an additional hydraulic motion control assembly 72 adapted to be selectively in fluid communication with the piston rod side 44", 46" of each cylinder 44, 46 associated with a wheel of the pair of front fore-wheels 16. Purely by way of example, and as is illustrated in FIG. 9, the additional hydraulic motion control assembly 72 may comprise an additional accumulator 74 and/or an additional throttling arrangement 76. In fact, the FIG. 9 implementation of the additional hydraulic motion control assembly 72 comprises an additional accumulator 74 as well as an additional throttling arrangement 76.

The above-mentioned selective fluid communication between the additional hydraulic motion control assembly 72 and the piston rod sides 44", 46" may be achieved by means of an additional selector valve 78 located between the piston rod sides 44", 46" and the additional hydraulic motion control assembly 72, as seen in an intended fluid flow direction therebetween. As may be gleaned from FIG. 9, the additional selector valve 78 may be adapted to assume a first condition, providing fluid communication between the piston rod sides 44", 46" and the additional hydraulic motion control assembly 72, and a second condition, providing fluid communication between the piston rod sides 44", 46" and a tank 80. The additional selector valve 78 may be adapted to receive signals from the electronic control unit 62.

Figure 10:
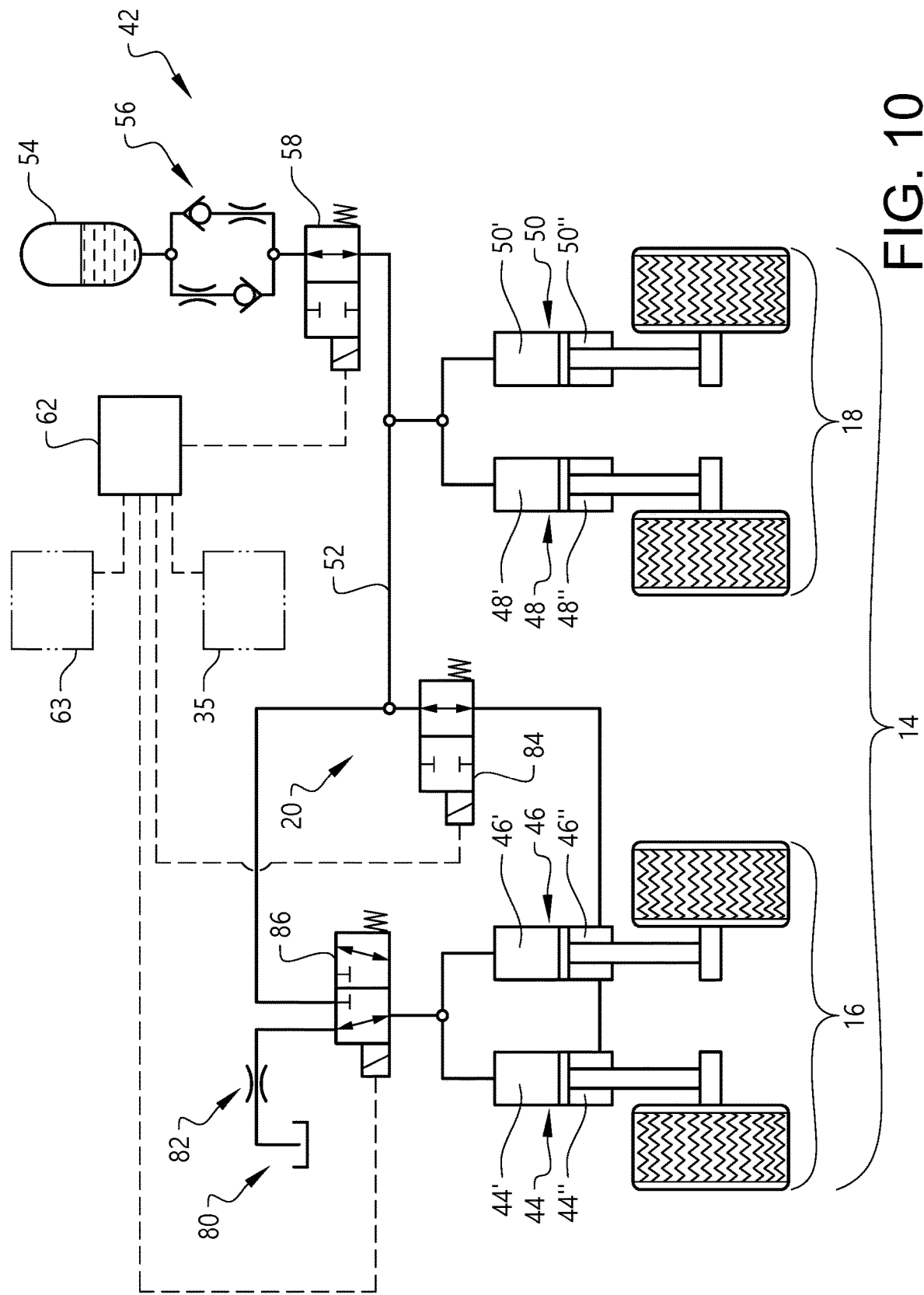
FIG. 10 illustrates a portion of yet another embodiment of a paver in accordance with the present invention.

FIG. 10 illustrates another embodiment of the present invention in which the hydraulic motion control assembly 42 further is selectively in fluid communication with the piston rod side 44", 46" of each cylinder 44, 46 associated with a wheel of the pair of front fore-wheels 16.

As such, and as is illustrated in FIG. 10, the piston rod side 44", 46" of each cylinder 44, 46 associated with a wheel of the pair of front fore-wheels 16 may be in selective fluid communication with the piston sides 48', 50' of the cylinders 48, 50 associated with the pair of back fore-wheels 18. To this end, the FIG. 10 embodiment comprises a connection selector valve 84 adapted to assume a connection condition, fluidly connecting the piston rod sides 44", 46" to the piston sides 48', 50', and a disconnecting condition, fluidly disconnecting the piston rod sides 44", 46" from the piston sides 48', 50'. The connection selector valve 84 may be adapted to receive signals from the electronic control unit 62.

Moreover, the FIG. 10 embodiment comprises a selector valve 58 between the hydraulic motion control assembly 42 and the piston sides 48', 50' of the cylinders 48, 50 associated with the pair of back fore-wheels 18. As such, when the connection selector valve 84 assumes its connection condition and when the selector valve 58 assumes its open condition, such valve conditions being illustrated in FIG. 10, the fluid communication is provided between the piston rod sides 44", 46", the piston sides 48', 50' and the hydraulic motion control assembly 42.

Moreover, in the embodiment illustrated in FIG. 10, the piston side 44', 46' of at least each cylinder associated with a front fore-wheel 16 is selectively in fluid communication with a hydraulic tank 80. As is exemplified in FIG. 10, the piston side 44', 46' of at least each cylinder associated with a front fore-wheel 16 is preferably selectively in fluid communication with a hydraulic tank 80 via a tank throttling arrangement 82.

As exemplified in FIG. 10, the paver 10 may comprise a tank connector valve 86 in fluid communication with the piston sides 44', 46' of each cylinder 44, 46 associated with a wheel of the pair of front fore-wheels 16. The tank connector valve 86 can assume a tank connection condition, providing fluid communication between the piston sides 44', 46' and the tank 80, and a piston side connection condition, providing fluid communication between the piston sides 44', 46', 48', 50'. The tank connector valve 86 may be adapted to receive signals from the electronic control unit 62.

When the connector valve 86 has assumed the tank connection condition, fluid may have been drained from the piston sides 44', 46' to the tank 80. As such, it may be desired to feed fluid to the piston sides 44', 46' prior to the paver 10 performing another type of operation, such as a paving operation. In order to be able to feed fluid to the piston sides 44', 46', the tank 80 of the FIG. 10 embodiment may be replaced by an assembly comprising a pressure source 65, a tank 69 and a pressure control valve 67. Such an assembly has been presented hereinabove with reference to FIG. 3 and the configuration and function of such an assembly is not repeated here. As another option, the connector valve 86 may be adapted to assume a third condition, viz a pump connection condition, providing fluid communication between the piston sides 44', 46' and a pump (not shown in FIG. 10) such that fluid may be fed to the piston sides 44', 46'.

It is to be understood that the present invention is not limited to the embodiments described above and illustrated in the drawings; rather, the skilled person will recognize that many changes and modifications may be made within the scope of the appended claims.

The invention claimed is:

1. A paver comprising:
a main vehicle body, and
a set of fore-wheels, said set of fore-wheels being connected to said main vehicle body via a hydraulic wheel suspension system which, in at least a paving mode of said paver, allows hydraulic level compensation for each wheel of said set of fore-wheels, wherein said paver further comprises a hydraulic motion control assembly adapted to selectively provide hydraulic spring suspension to at least one wheel of said set of fore-wheels.

2. The paver according to claim 1, wherein said set of fore-wheels comprises a pair of front fore-wheels and a pair of back fore-wheels, as seen in an intended forward direction of travel of said paver, said hydraulic motion control assembly being adapted to selectively provide hydraulic spring suspension to at least each wheel of said pair of back fore-wheels.

3. The paver according to claim 2,
wherein said hydraulic wheel suspension system comprises a plurality of cylinders, with a cylinder associated with each wheel of said set of fore-wheels, each cylinder having a piston side and a piston rod side; and
wherein said hydraulic motion control assembly is selectively in fluid communication with the piston side of each cylinder associated with a wheel of said pair of back fore-wheels; and
wherein said hydraulic motion control assembly further is selectively in fluid communication with the piston side of each cylinder associated with a wheel of said pair of front fore-wheels.

4. The paver according to claim 1, wherein said hydraulic motion control assembly comprises a hydraulic accumulator, wherein said hydraulic motion control assembly comprises a throttling arrangement in fluid communication with said hydraulic accumulator.

5. The paver according to claim 1, wherein said hydraulic wheel suspension system comprises a plurality of cylinders, with a cylinder associated with each wheel of said set of fore-wheels, each cylinder having a piston side and a piston rod side.

6. The paver according to claim 5,
wherein said set of fore-wheels comprises a pair of front fore-wheels and a pair of back fore-wheels, as seen in an intended forward direction of travel of said paver, said hydraulic motion control assembly being adapted to selectively provide hydraulic spring suspension to at least each wheel of said pair of back fore-wheels; and
wherein said hydraulic motion control assembly comprises a first hydraulic accumulator selectively, via a first selector valve, in fluid communication with said piston side of said cylinder associated with a first wheel of said pair of back fore-wheels and a second hydraulic accumulator selectively, via a second selector valve, in fluid communication with said piston side of said cylinder associated with a second wheel of said pair of back fore-wheels.

7. The paver according to claim 6, wherein said piston side of said cylinder associated with said first wheel and said piston side of said cylinder associated with said second wheel are connected to each other via a back fore-wheels division valve, and
wherein said back fore-wheels division valve is adapted to assume at least each one of an open condition, allowing fluid communication between said piston sides, and a throttling condition, allowing throttling of fluid flowing between said piston sides.

8. The paver according to claim 6, wherein said paver further comprises an additional hydraulic motion control assembly adapted to be selectively in fluid communication with the piston rod side of each cylinder associated with a wheel of said pair of front fore-wheels, said additional hydraulic motion control assembly comprising an additional accumulator and/or an additional throttling arrangement.

9. The paver according to claim 6, wherein said hydraulic motion control assembly further is selectively in fluid communication with the piston rod side of each cylinder associated with a wheel of said pair of front fore-wheels.

10. The paver according to claim 9, wherein the piston side of at least each cylinder associated with a wheel of said pair of front fore-wheels is selectively in fluid communication with a hydraulic tank, via a tank throttling arrangement.

11. The paver according to claim 1, wherein said hydraulic motion control assembly is adapted to be in fluid communication with said hydraulic wheel suspension system via a selector valve.

12. The paver according to claim 11,
wherein said hydraulic wheel suspension system comprises a plurality of cylinders, with a cylinder associated with each wheel of said set of fore-wheels, each cylinder having a piston side and a piston rod side; and
wherein said hydraulic wheel suspension system comprises an equalising line fluidly connecting at least said piston side of said cylinders associated with each wheel of said set of fore-wheels, said hydraulic motion control assembly being adapted to be in fluid communication with said equalising line via said selector valve.

13. The paver according to claim 11, wherein said selector valve is adapted to assume a closed condition, preventing fluid communication between said hydraulic wheel suspension system and said hydraulic motion control assembly, said selector valve further being adapted to assume an open condition, allowing fluid communication between said hydraulic wheel suspension system and said hydraulic motion control assembly, and
wherein said paver comprises a screed adapted to be in a lowered position in said paving mode and in a raised position in a non-paving mode, said selector valve being adapted to assume said closed condition when said screed is in said lowered position and adapted to assume said open condition when said screed is in said raised position.

14. The paver according to claim 1, wherein each wheel of said set of fore-wheels is a solid material wheel.

15. The paver according to claim 1, wherein said paver further comprises a pair of rear wheels connected to said main vehicle body, said pair of rear wheels being adapted to propel said paver.

16. The paver according to claim 15, wherein said pair of rear wheels comprises pneumatic tires.

17. A method for operating a paver, said paver comprising a main vehicle body, said paver comprising a set of fore-wheels, said set of fore-wheels being connected to said main vehicle body via a hydraulic wheel suspension system, said paver being operable in at least each one of a paving mode and a non-paving mode, said method comprising:

determining if said paver is operating in said paving mode or in said non-paving mode, and upon determination that said paver is operating in said non-paving mode, providing hydraulic spring suspension to at least one wheel of said set of fore-wheels by means of a hydraulic motion control assembly, and upon determination that said paver is operating in said paving mode, preventing said hydraulic spring suspension by means of said hydraulic motion control assembly.

18. The method according to claim 17, wherein said set of fore-wheels comprises a pair of front fore-wheels and a pair of back fore-wheels, as seen in an intended forward direction of travel of said paver, said method comprising:

upon determination that said paver is operating in said non-paving mode, providing said hydraulic spring suspension to at least each wheel of said pair of back fore-wheels.

19. The method according to claim 17, wherein said method further comprises:

upon determination that said paver is operating in said paving mode, controlling said hydraulic wheel suspension system as to allow hydraulic level compensation for each wheel of said set of fore-wheels.

20. The method according to claim 17, wherein said hydraulic motion control assembly is adapted to be in fluid communication with said hydraulic wheel suspension system via a selector valve, wherein the step of providing said hydraulic spring suspension comprises arranging said selector valve in an open condition, allowing fluid communication between said hydraulic wheel suspension system and said hydraulic motion control assembly.

21. The method according to claim 20, wherein said paver comprises a screed adapted to be moveable relative to said main vehicle body, said method comprising detecting the position of said screed relative to said main vehicle body and:

determining that said paver is operating in said paving mode upon detection that said screed is in a lowered position and determining that said paver is operating in said non-paving mode upon detection that said screed is in a raised position.

22. The method according to claim 17, wherein in at least a paving mode of said paver, said hydraulic wheel suspension system allows hydraulic level compensation for each wheel of said set of fore-wheels, and wherein said hydraulic motion control assembly is adapted to selectively provide hydraulic spring suspension to at least one wheel of said set of fore-wheels.

23. An electronic control unit for a paver, said paver comprising a main vehicle body, said paver comprising a set of fore-wheels, said set of fore-wheels being connected to said main vehicle body via a hydraulic wheel suspension system which, in at least a paving mode of said paver, allows hydraulic level compensation for each wheel of said set of fore-wheels, said paver further comprising a hydraulic motion control assembly adapted to selectively provide hydraulic spring suspension to at least one wheel of said set of fore-wheels, said electronic control unit being adapted to:

receive sensor signals to determine if said paver is operating in said paving mode or in a non-paving mode;

upon determination that said paver is operating in said non-paving mode, issue a control signal to said paver so as to provide hydraulic spring suspension to at least one wheel of said set of fore-wheels by means of said hydraulic motion control assembly; and upon determination that said paver is operating in said paving mode, issue a control signal to said paver so as to prevent said hydraulic spring suspension by means of said hydraulic motion control assembly.

24. The electronic control unit according to claim 23, wherein said hydraulic motion control assembly is adapted to be in fluid communication with said hydraulic wheel suspension system via a selector valve, wherein issuing the control signal to said paver so as to provide said hydraulic spring suspension comprises issuing a signal to said selector valve to assume an open condition, allowing fluid communication between said hydraulic wheel suspension system and said hydraulic motion control assembly.

25. The electronic control unit according to claim 23, wherein said paver comprises a screed adapted to be moveable relative to said main vehicle body, said electronic control unit being adapted to receive a signal indicative of the position of said screed relative to said main vehicle body and determining that said paver is operating in said paving mode upon detection that said screed is in a lowered position, and determining that said paver is operating in said non-paving mode upon detection that said screed is in a raised position.

\* \* \* \* \*